(12) United States Patent
Foley et al.

(10) Patent No.: US 9,318,226 B2
(45) Date of Patent: *Apr. 19, 2016

(54) APPARATUS AND METHOD TO INSPECT, MODIFY, OR REPAIR NUCLEAR REACTOR CORE SHROUDS

(71) Applicant: WESTINGHOUSE ELECTRIC COMPANY LLC, Cranberry Township, PA (US)

(72) Inventors: Kevin J. Foley, Chattanooga, TN (US); Mark Steve Everett, Hixson, TN (US); Charles R. Barrett, Ooltewah, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 574 days.

This patent is subject to a terminal disclaimer.

(21) Appl. No.: 13/798,474

(22) Filed: Mar. 13, 2013

(65) Prior Publication Data

US 2014/0098922 A1 Apr. 10, 2014

Related U.S. Application Data

(60) Provisional application No. 61/711,240, filed on Oct. 9, 2012.

(51) Int. Cl.
*G21C 17/013* (2006.01)
*G21C 17/007* (2006.01)
*G21C 17/003* (2006.01)

(52) U.S. Cl.
CPC ............ *G21C 17/013* (2013.01); *G21C 17/003* (2013.01); *G21C 17/007* (2013.01)

(58) Field of Classification Search
CPC .......................... G21C 17/013; G21C 17/007
USPC .......................................... 376/249; 165/11.2
See application file for complete search history.

(56) References Cited

U.S. PATENT DOCUMENTS 5,661,242 A * 8/1997 Schreiner et al. ............. 376/249
5,784,425 A * 7/1998 Morlan ......................... 376/249
(Continued)

FOREIGN PATENT DOCUMENTS

| JP | 7-110320 A | * | 4/1995 |
|----|------------|---|--------|
| JP | H09159788 A | | 6/1997 |
| JP | H09211182 A | | 8/1997 |
| JP | H11311692 A | | 11/1999 |
| JP | 2006061976 A | | 3/2006 |

OTHER PUBLICATIONS

International Preliminary Report on Patentability for PCT/US2013/063676 dated Apr. 23, 2015.
International Search Report and Written Opinion of the International Searching Authority for PCT/US2013/063676 dated Jul. 10, 2014.

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

This invention generally concerns robotic systems and is particularly concerned with improved apparatus and methods for remotely inspecting, modifying or repairing a core shroud in a nuclear reactor. The apparatus of the invention includes a partial upper track which horizontally movable along the core shroud, a head and frame assembly which is horizontally movable along the partial upper track, a lower track which is connected to the head and frame assembly and is horizontally movable along the core shroud, and a carriage and arm assembly which extends downward into an annulus formed by the reactor pressure vessel and the core shroud, wherein the arm includes at least one sensor for inspecting the core shroud.

7 Claims, 10 Drawing Sheets

(56) References Cited

U.S. PATENT DOCUMENTS

| | | |
|---|---|---|
| 7,092,477 B2 * | 8/2006 | Wivagg et al. ............... 376/249 |
| 2007/0146480 A1 | 6/2007 | Judge, Jr. et al. |
| 2008/0317192 A1 | 12/2008 | Rowell et al. |
| 2010/0242247 A1 | 9/2010 | Jones et al. |
| 2013/0243144 A1 * | 9/2013 | Villagomez ................. 376/249 |

\* cited by examiner

APPARATUS AND METHOD TO INSPECT, MODIFY, OR REPAIR NUCLEAR REACTOR CORE SHROUDS

CROSS-REFERENCE TO RELATED APPLICATIONS

This application claims priority under 35 U.S.C. Section 119(e) from Provisional Application 61/711,240, entitled "Apparatus and Method to Inspect, Modify, or Repair Nuclear Reactor Core Shrouds" filed on Oct. 9, 2012.

FIELD OF THE INVENTION

This invention generally concerns robotic systems and is specifically concerned with an improved apparatus and method for remotely inspecting, modifying or repairing a core shroud in a nuclear reactor.

BACKGROUND OF THE INVENTION

A nuclear reactor produces electrical power by heating water in a reactor pressure vessel that contains a nuclear fuel core in order to generate steam which is used in turn to drive a steam turbine. The reactor pressure vessel includes a cylinder surrounding the nuclear fuel core. This cylinder is the core shroud. Feed water is admitted into the reactor pressure vessel and flows through an annular region which is formed between the reactor pressure vessel and the core shroud. Within the annular region, jet pump assemblies are circumferentially distributed around the core shroud. The core shroud includes various welds which are later discussed in detail herein. A core shroud head is positioned atop the core shroud. The material of the core shroud and associated welds is austenitic stainless steel having reduced carbon content. The heat-affected zones of the shroud welds have residual weld stresses. Therefore, the mechanisms are present for the shroud welds to be susceptible to stress corrosion cracking.

Stress corrosion cracking in the heat affected zone of any shroud weld diminishes the structural integrity of the shroud. In particular, a cracked shroud increases the risks posed by a Loss-of-Coolant Accident (LOCA) or seismic loads. During a LOCA, the loss of coolant from the reactor pressure vessel produces a loss of pressure above the shroud head and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant. Also, if the shroud weld zones fail due to stress corrosion cracking, there is a risk of misalignment from seismic loads and damage to the core and the control rod components, which would adversely affect control rod insertion and safe shutdown.

Thus, the core shroud is examined periodically to determine its structural integrity and the need for repair. Ultrasonic inspection is a known technique for detecting cracks in nuclear reactor components. The inspection area of primary interest is the outside surface of the core shroud and the horizontal mid-shroud attachment welds. However, the core shroud is difficult to access. Installation access is limited to the annular space between the outside of the shroud and the inside of the reactor pressure vessel, between adjacent jet pumps. Scanning operation access is additionally restricted within the narrow space between the shroud and jet pumps.

The inspection areas are highly radioactive, and are located under water 50 to 80 feet below the operator's work platform. Thus, inspection of the core shroud in operational nuclear reactors requires a robotic device which can be installed remotely and operated within a narrowly restricted space.

Remote operation is mandatory due to safety risks associated with radiation in the reactor. During reactor shutdown, servicing of components requires installation of inspection manipulators or devices 30 to 100 feet deep within reactor coolant. The inspection equipment typically consists of manually controlled poles and ropes to manipulate servicing devices and/or positioning of these devices. Relatively long durations are required to install or remove manipulators and can impact the plant shutdown duration. In addition, different inspection scopes can require several manipulator reconfigurations requiring additional manipulator installations and removals. The long durations cannot only impact plant shutdown durations, but also increase personnel radiation and contamination exposure.

Plant utilities have a desire to reduce the number of manipulator installations and removals to reduce radiological exposure as well as cost and plant outage impact. This invention allows the number of reconfigurations, installations and removals to be minimized. In addition, plant utilities have relatively small working areas near the access point of the reactor cavity. Therefore, the size of the manipulators can impact other activities during plant shutdown. The design of this invention allows the elimination of large track ring typically utilized on similar equipment. Plant utilities also desire flexible and effective coverage on the reactor core shroud. This invention allows the manipulator operations to position end effectors in various locations on the shroud which are often inaccessible to currently designed tooling. The small profile and flexible axes system of this invention provide efficient core shroud coverage which can be significantly greater than the coverage provided by currently existing equipment.

SUMMARY OF THE INVENTION

The invention provides apparatus and methods for inspecting a core shroud in a reactor vessel. In one aspect, the invention provides an apparatus for remotely inspecting a core shroud of a nuclear reactor. The apparatus includes a partial upper track positioned on an annular rim of the core shroud and horizontally movable along the rim, an assembly which includes a head movably connected to the partial upper track such that the head is horizontally movable along the partial upper track, a lower track, a frame having a first end and a second end, the first end being mounted to the head and the second end being connected to the lower track such that the lower track is horizontally movable along the core shroud, a carriage movably connected to the lower track, a scan arm connected to the carriage and extending vertically downward along the core shroud, and at least one sensor connected to the scan arm for inspecting the core shroud.

The partial upper track can be positioned on a steam dam of the core shroud as a result of its center of gravity. The head can include a positioning motor and gear combination to move the head along the partial upper track. A track brake system can be connected to the partial upper track. In certain embodiments, when the track brake system is activated, the partial upper track is stationary on the rim of the core shroud and when the track brake system is released, the partial upper track is horizontally movable along the rim of the core shroud.

The head can include a positioning pin which is vertically extendable. In certain embodiments, when the positioning pin is extended and the track brake system is released, the head is stationary relative to the core shroud and the partial upper track is horizontally movable along the rim of the core shroud.

Bearing wheels can be attached to the frame such that the frame is horizontally movable along the lower track. The carriage can include at least one motor/gear combination and a pneumatic/hydraulic cylinder such that the carriage is horizontally movable along the lower track and the scan arm is pivotally movable relative to the carriage. The sensor can be an ultrasonic transducer.

In another aspect, the invention provides a method for inspecting a core shroud of a nuclear reactor. The method includes positioning an inspection tool on an annular rim of the core shroud such that the tool at least partially vertically extends into an annulus formed between the core shroud and the nuclear reactor. The inspection tool includes a partial upper track, a head and frame assembly, a lower track, a carriage and arm assembly, and at least one sensor connected to the scan arm. The method further includes moving horizontally at least one of the partial upper track, the head and frame assembly, the lower track, and the carriage along the annular rim of the core shroud such that the sensor scans the core shroud.

The partial upper track can be horizontally moved from a first position to a second position along the annular rim of the core shroud and the head and frame assembly remains stationary. The carriage and arm assembly can be moved from a first position to a second position along the lower track and the lower track can be moved from a first position to a second position relative to the head and frame assembly. The method can further include assessing the inspection results and determining if modification or repair of the core shroud is needed.

In another aspect, the invention provides a method for inspecting a core shroud of a nuclear reactor. The method includes positioning an inspection tool on an annular rim of the core shroud such that the tool at least partially vertically extends into an annulus formed between the core shroud and the nuclear reactor. The inspection tool includes a head and frame assembly, a lower track movably connected to the head and frame assembly, a carriage and arm assembly movably connected to the lower track, and at least one sensor connected to the carriage and arm assembly. The method further includes moving horizontally at least one of the head and frame assembly, the lower track, and the carriage along the annular rim of the core shroud such that the sensor scans the core shroud.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENTS

It will be understood that, although the terms first, second, etc. may be used herein to describe various elements, these elements should not be limited by these terms. There terms are only used to distinguish one element from another. For example, a first element could be termed a second element, and similarly, a second element could be termed a first element, without departing from the scope of the embodiments. As used herein, the term "and/or" includes any and all combinations of one or more of the associated listed items.

It should be understood that when an element of component is referred to as being "on", "connected to," "coupled to," or "covering" another element or layer, it may be directly on, connected to, coupled to, or covering the other element or layer or intervening elements or components may be present.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the present or addition of one or more other features, integers, steps, operations, elements, components and/or groups thereof.

The invention relates to robotic devices for remotely inspecting, modifying or repairing a core shroud of a reactor pressure vessel in a nuclear power plant. In certain embodiments, the nuclear power plant includes a light water reactor, such as a boiling water reactor or a pressurized water reactor. The reduced thickness and the two-axis positioner of the device allow for positioning and operation of the device in the narrow annulus space provided between the core shroud and a wall of the reactor pressure vessel. Further, these features allow the device to be maneuvered and configured circumferentially and vertically around jet pumps (and other obstructions) that are located in the annulus space.

Figure 1A:
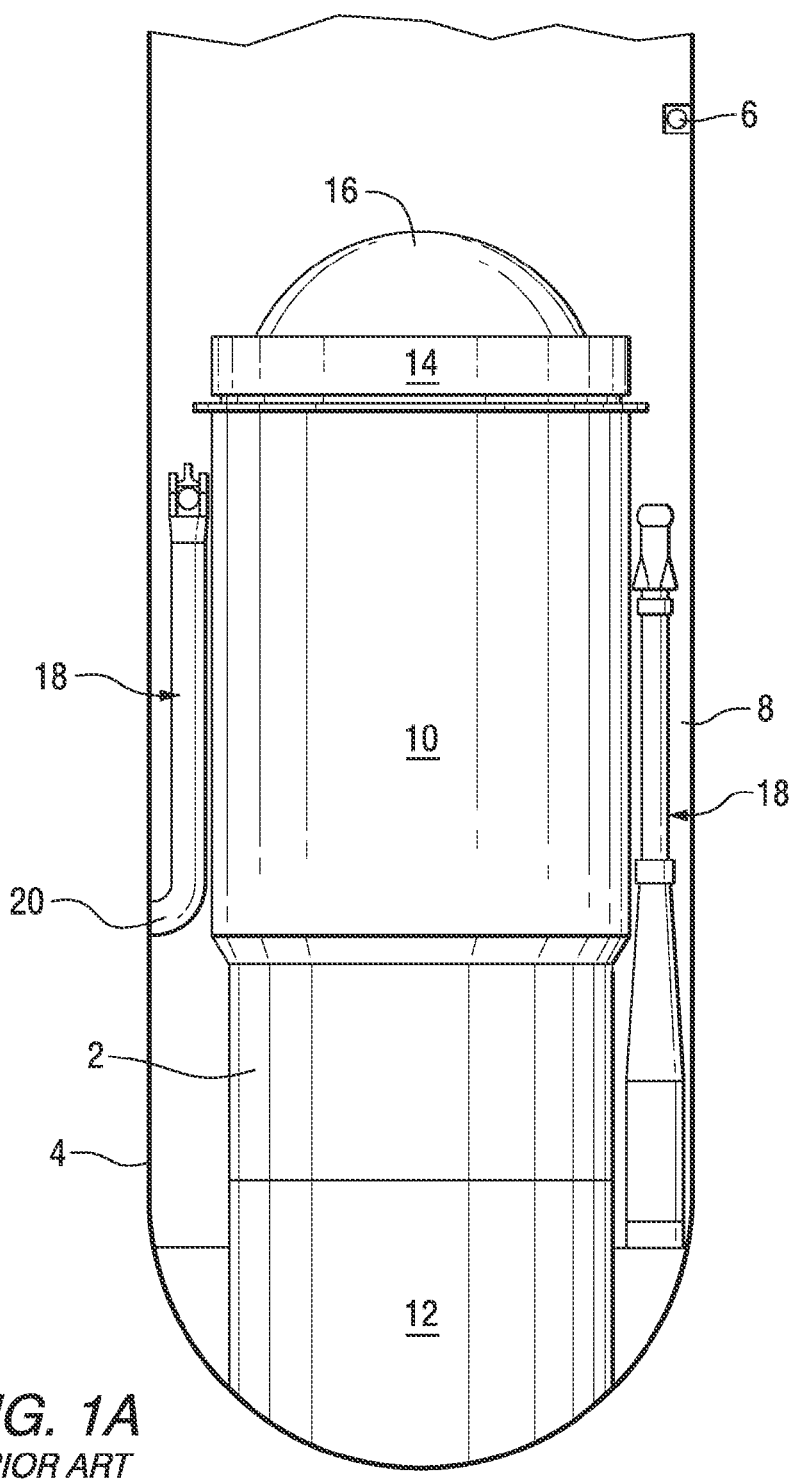
FIG. 1A is a schematic showing an elevational view of pertinent portions of a conventional BWR, in accordance with the prior art.

Referring to FIG. 1A, there is illustrated a core shroud 2 in a reactor pressure vessel (RPV) 4 of a conventional boiling water reactor (BWR). Feedwater is admitted into the RPV 4 via a feedwater inlet (not shown) and a feedwater sparger 6, which is a ring-shaped pipe having suitable apertures for circumferentially distributing the feedwater inside the RPV 4. The feedwater from the sparger 6 flows downwardly through a downcomer annulus 8, which is an annular region formed between the core shroud 2 and the RPV 4.

The core shroud 2 is a stainless steel cylinder surrounding the nuclear fuel core, the location of which is generally designated by numeral 10 in FIG. 1. The core is made up of a plurality of fuel bundle assemblies (not shown). Each array of fuel bundle assemblies is supported at the top by a top guide and at the bottom by a core plate (neither of which are shown). The core top guide provides lateral support for the top of the fuel assemblies and maintains the correct fuel channel spacing to permit control rod insertion.

The feedwater flows through the downcomer annulus 8, into the jet pumps 18, and into the core lower plenum 12. The feedwater subsequently enters the fuel assemblies, wherein a boiling boundary layer is established. A mixture of water and steam enters a core upper plenum 14 under a shroud head 16. The steam-water mixture than flows through vertical standpipes (not shown) atop the shroud head 16 and enters steam separators (not shown), which separate liquid water from steam. The liquid water then mixes with feedwater in the mixing plenum, which mixture then returns to the reactor core via the downcomer annulus 8. The steam is withdrawn from the RPV via a steam outlet.

The BWR also includes a coolant recirculation system which provides the forced convection flow through the core which is necessary to attain the required power density. A portion of the water is removed from the lower end of the downcomer annulus 8 via a recirculation water outlet (not visible in FIG. 1) and forced by a centrifugal recirculation pump (not shown) into jet pump assemblies 18 (two of which are shown in FIG. 1A) via recirculation water inlets 20. The BWR has two recirculation pumps, each of which provides the driving flow for a plurality of jet pump assemblies. The jet pump assemblies are circumferentially distributed around the core shroud 2.

Figure 1B:
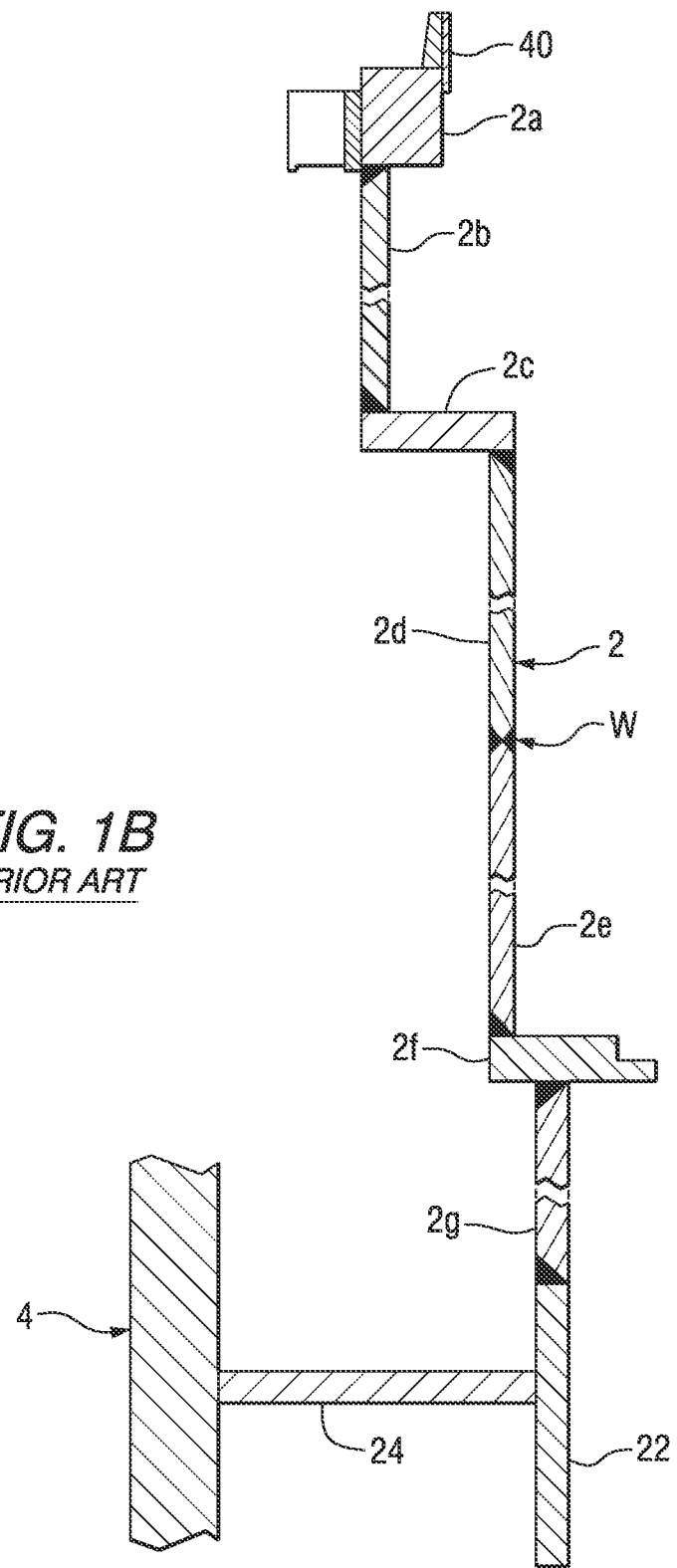
FIG. 1B is a sectional view of a portion of the core shroud incorporated in the BWR depicted in FIG. 1A, in accordance with the prior art.

Referring to FIG. 1B, there is illustrated the core shroud 2 in detail. There is a shroud head flange 2a for supporting the shroud head 16, a circular cylindrical upper shroud wall 2b having a top end welded to shroud head flange 2a, an annular top guide support ring 2c welded to the bottom end of the upper shroud wall 2b, a circular cylindrical middle shroud wall having a top end welded to top guide support ring 2c and consisting of upper and lower shell sections 2d and 2e joined by mid-shroud attachment weld, and an annular core plate support ring 2f welded to the bottom end of the middle shroud wall and to the top end of a lower shroud wall 2g. The entire shroud is supported by a shroud support 22, which is welded to the bottom of lower shroud wall 2g, and by annular jet pump support plate 24, which is welded at its inner diameter to shroud support 22 and at its outer diameter to RPV 4.

The material of the shroud and associated welds is austenitic stainless steel having reduced carbon content. The heat-affected zones of the shroud girth welds, including the mid-shroud attachment weld, have residual weld stresses. Therefore, the mechanisms are present for mid-shroud attachment weld W and other girth welds to be susceptible to stress corrosion cracking.

The apparatus of the invention is in contact with the core shroud and operated in the annulus formed between the reactor pressure vessel and the core shroud to perform an inspection of the core shroud and any welds associated therewith. The apparatus includes an upper partial track which is positioned, e.g., placed on or connected to, a portion of the core shroud, such as an upper annular rim of the core shroud. In one embodiment, the upper partial track is placed on the steam dam of the core shroud and is supported thereon by its center of gravity. The upper partial track guides a precision head and rigid frame structure which is movably coupled to the upper partial track. The rigid frame structure extends vertically downward from the precision head. The precision head and frame structure includes an electric motor and ball bearings or the like which allows the structure to travel horizontally along the upper partial track. Further, the upper track contains motors and brakes which are systemically configured to allow the use of this apparatus without a complete track ring. The head and frame structure houses a sensor positioner for performing inspections or repairs on upper barrel regions of the core shroud. The precision head and frame are also operable to position a moveable lower track. The lower track region houses a lower arm and positioner to perform inspections or repairs on middle and lower reactor core shroud barrel regions. The positioner is a two-axis positioner which allows displacement of the arm vertically and circumferentially along the core shroud. At least one sensor, such as an ultrasonic transducer, is connected to the lower arm for inspecting the core shroud. In certain embodiments, the lower arm can include multiple sensors in a spaced apart relationship to each other.

Figure 2:
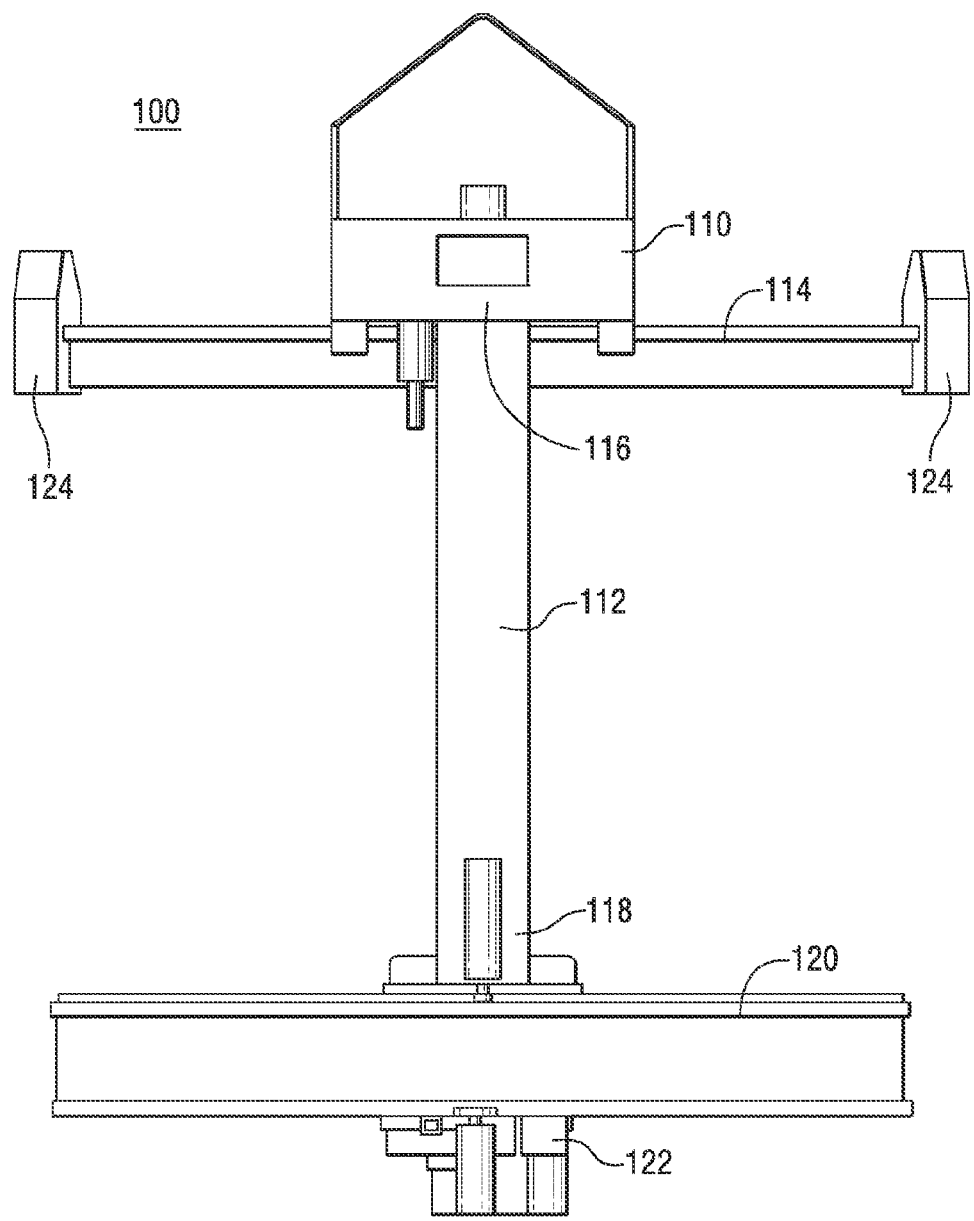
FIG. 2 is a front view of a core shroud inspecting apparatus, in accordance with certain embodiments of the invention.

Referring to FIG. 2, there is illustrated a core shroud inspecting apparatus generally referred to by reference character 100 for inspecting a core shroud in a nuclear reactor, in accordance with certain embodiments of the invention. The apparatus 100 includes a head 110, a frame 112 and a partial upper track 114. The frame 112 has an upper end 116 and an opposite lower end 118. The upper end 116 of the frame 112 is mounted to the head 110. The head 110 is connected to the partial upper track 114 for suitably moving in a horizontal direction relative to the partial upper track 114. The lower end 118 of the frame 112 is mounted to a lower track 120 for suitably moving the lower track 120 relative to the frame 112. A carriage 122 is coupled to the lower track 120 for suitably moving horizontally relative to the lower track 120. In certain embodiments, the partial upper track 114 and the lower track 120 are curved to suitably conform to the cylindrical shape of the core shroud in the nuclear reactor.

The partial upper track 114 includes a track brake system 124. When the track brake system 124 is activated, the partial upper track 114 remains stationary and the head 110 (and frame 112 mounted thereto) is horizontally movable along the partial upper track 114. When the track brake system 124 is deactivated or released, the partial upper track 114 can be driven into a different position along the rim of the core shroud. The track brake system 124 allows the head 110 and frame 112 to walk along the shroud without requiring a complete guide track ring. Thus, the head 110 and frame 112 are horizontally movable to drive along the partial upper track 114, or alternatively, the partial upper track 114 is horizontally movable to be driven into a different position along the rim of the core shroud.

Figure 3:
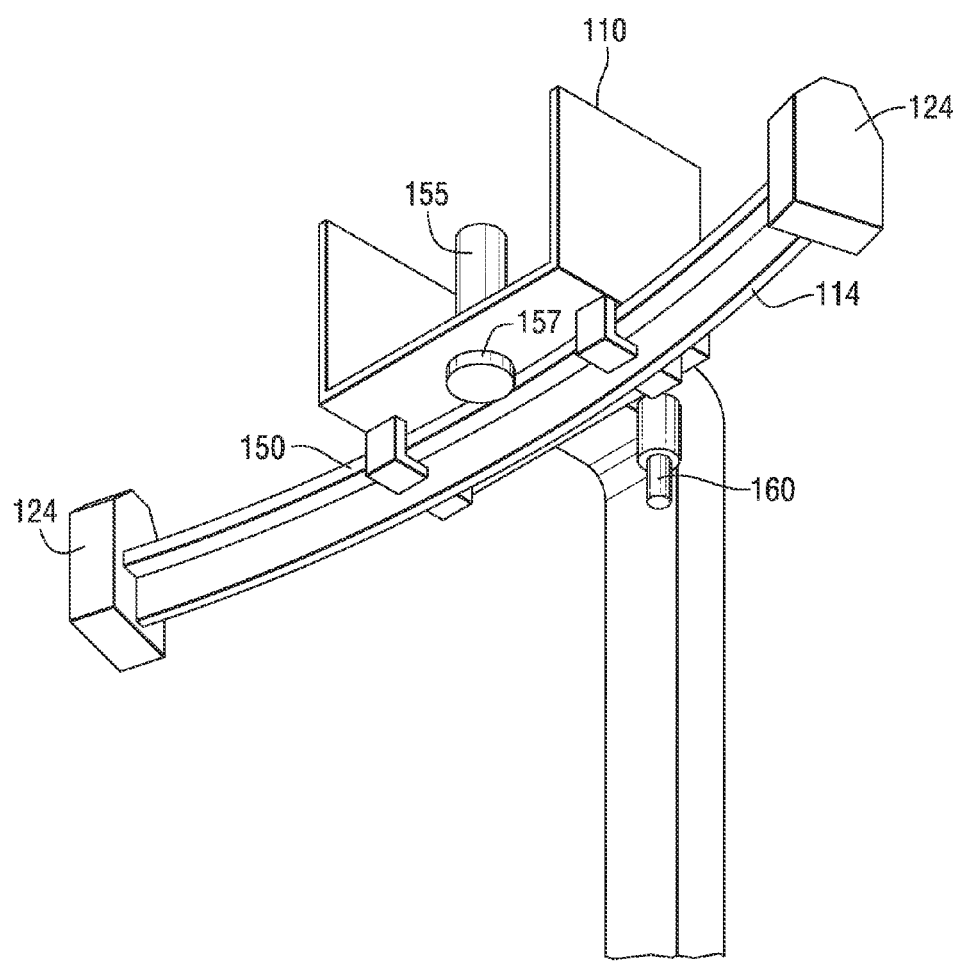
FIG. 3 is a perspective view of the core shroud inspecting apparatus of FIG. 2 showing a fixed gear rack mechanism, in accordance with certain embodiments of the invention.

Referring to FIG. 3, there is illustrated a fixed gear rack mechanism 150 for moving the partial upper track 114 along the core shroud. The fixed gear rack mechanism 150 interfaces with a positioning motor 155 and gear combination 157 located within the head 110. When the motor 155 is driven, the head 110 is moved relative to the partial upper track 114. If the track brake system 124 is applied, the partial upper track 114 will remain stationary relative to the core shroud and the head 110 moves relative to the partial upper track 114 and the core shroud. Alternatively, a positioning pin 160 can be pneumatically or hydraulically extended from the head 110 to react with reactor hardware positioned on the rim of the core shroud. If the position pin 160 is extended and the track brake system 124 is released, the head 110 remains stationary relative to the core shroud and the partial upper track will move relative to the core shroud. This provides for relocation of the entire apparatus 100 relative to the core shroud. The head motor 155 provides full position feedback so that global positioning of the entire apparatus is maintained and monitored within a tight tolerance.

Figure 4:
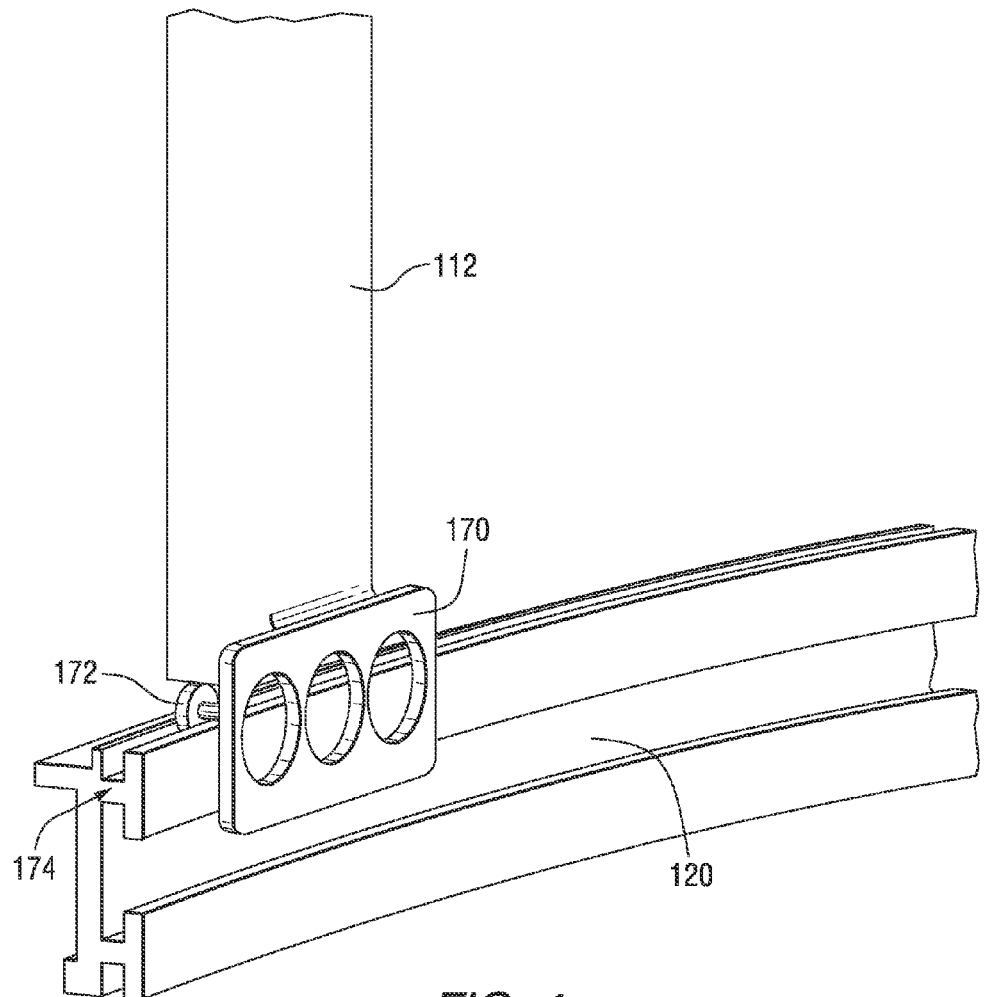
FIG. 4 is a perspective view of the core shroud inspecting apparatus of FIG. 2 showing a movable bearing system, in accordance with certain embodiments of the invention.

Referring to FIG. 4, there is illustrated a movable bearing system 170 which allows the lower track 120 to be driven relative to the frame 112 and to reach positions along the core shroud which are outside of the typical boundaries and obstructions exhibited by known apparatus. The frame 112 contains bearing wheels 172 that roll along guides 174 coupled to the lower track 120.

Figure 5:
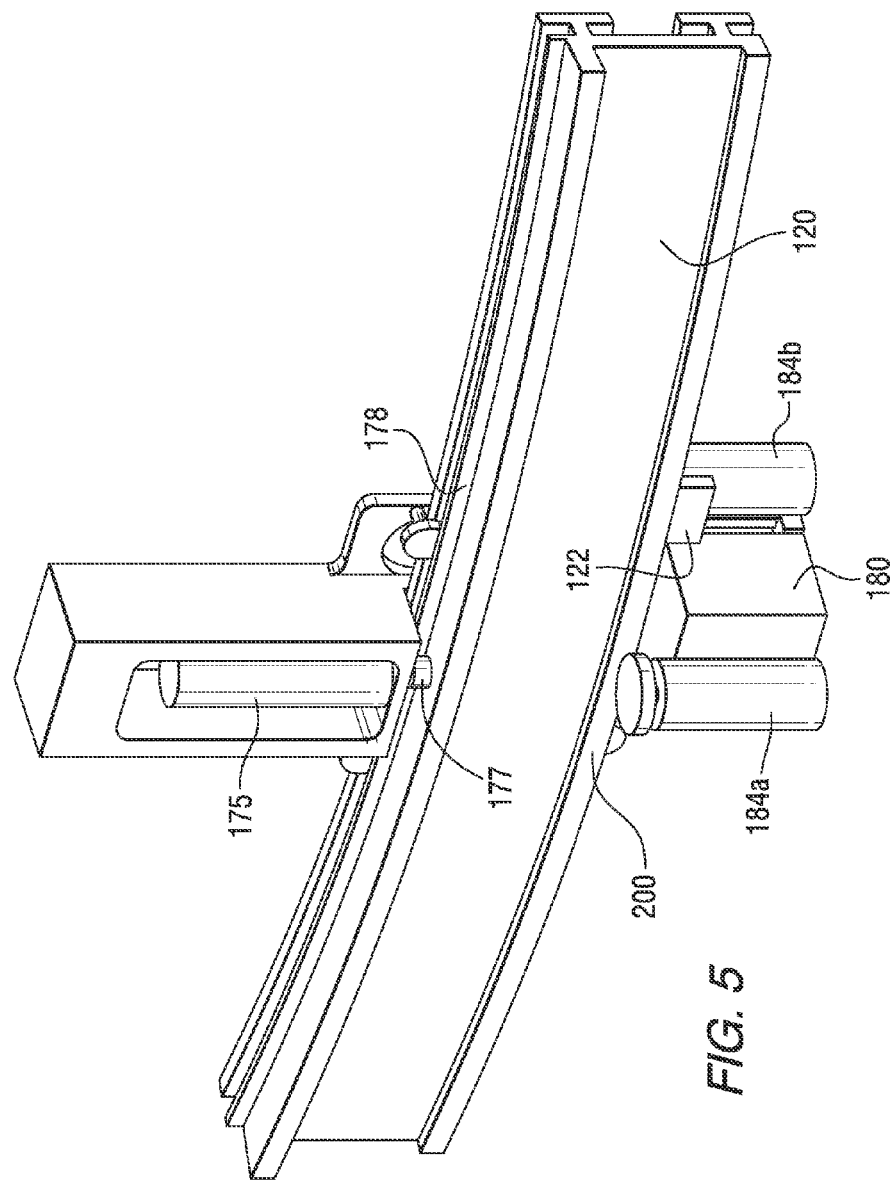
FIG. 5 is a detailed view of the lower track of the core shroud inspecting apparatus of FIG. 2, in accordance with certain embodiments of the invention.
Figure 6A:
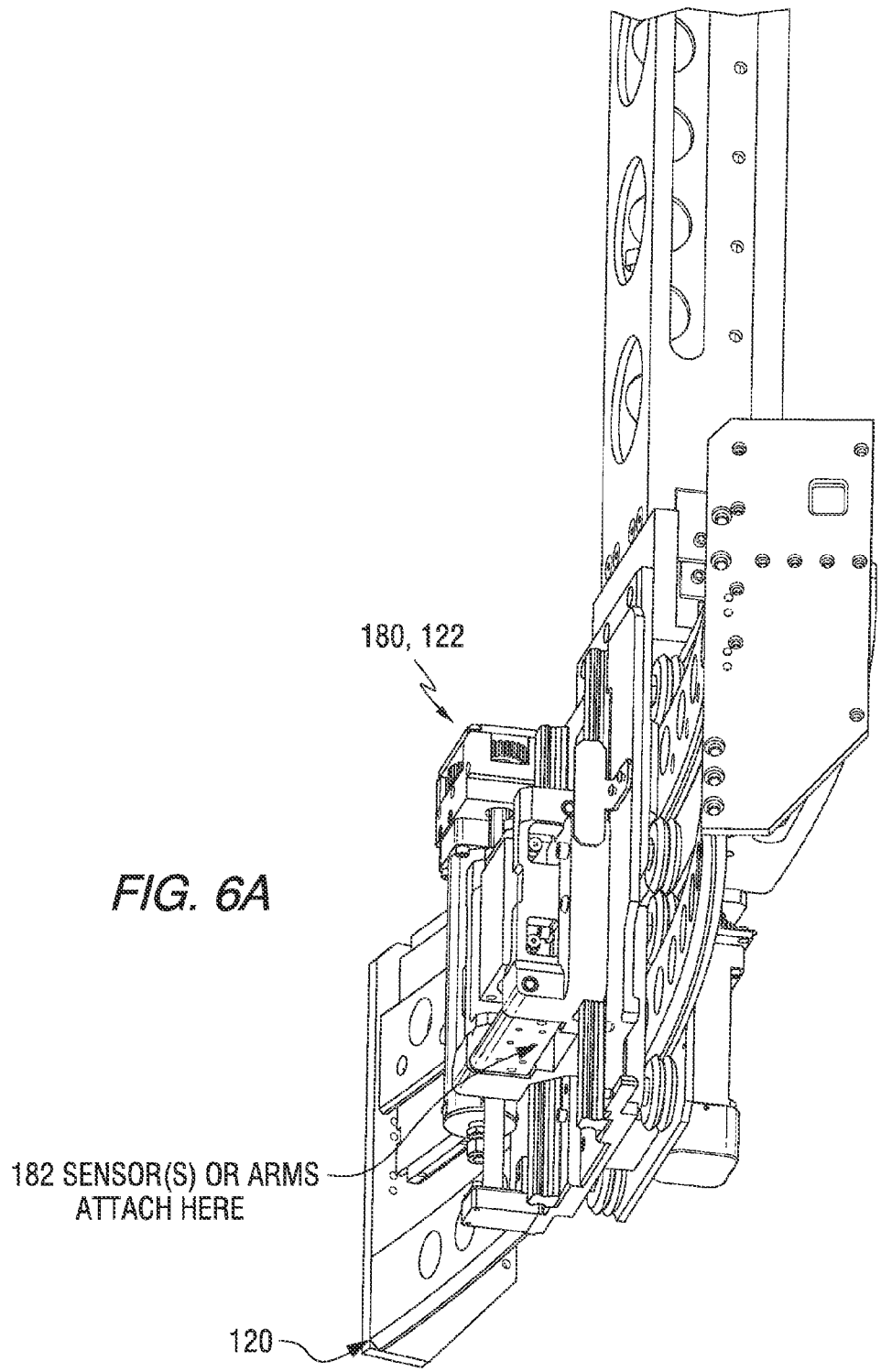
FIGS. 6A through 6D are detailed views of the precision positioners for the end effectors of the core shroud inspecting apparatus of FIG. 2, in accordance with certain embodiments of the invention.
Figure 6B:
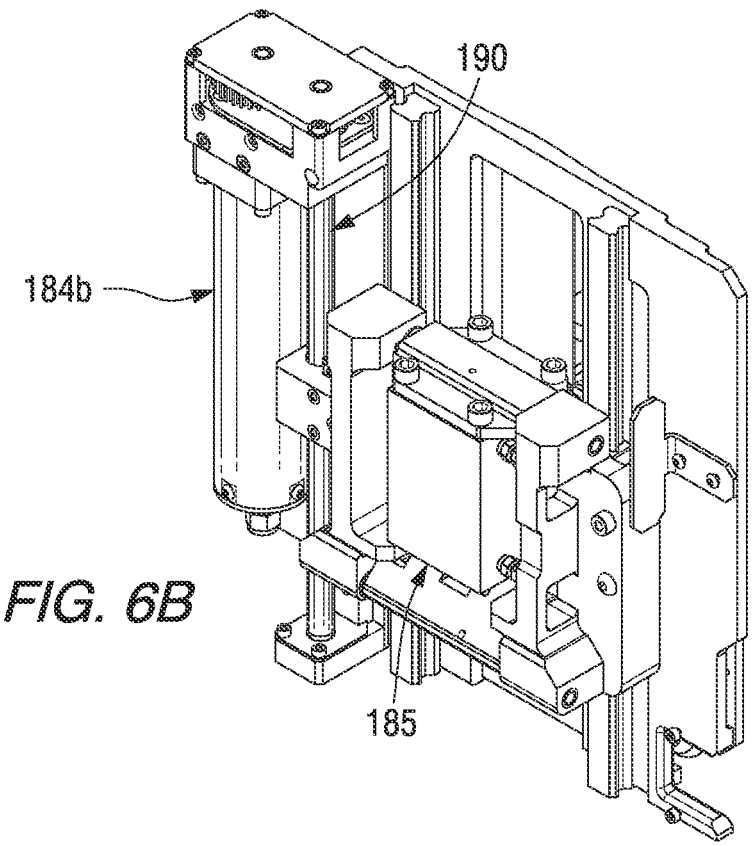
Figure 6C:
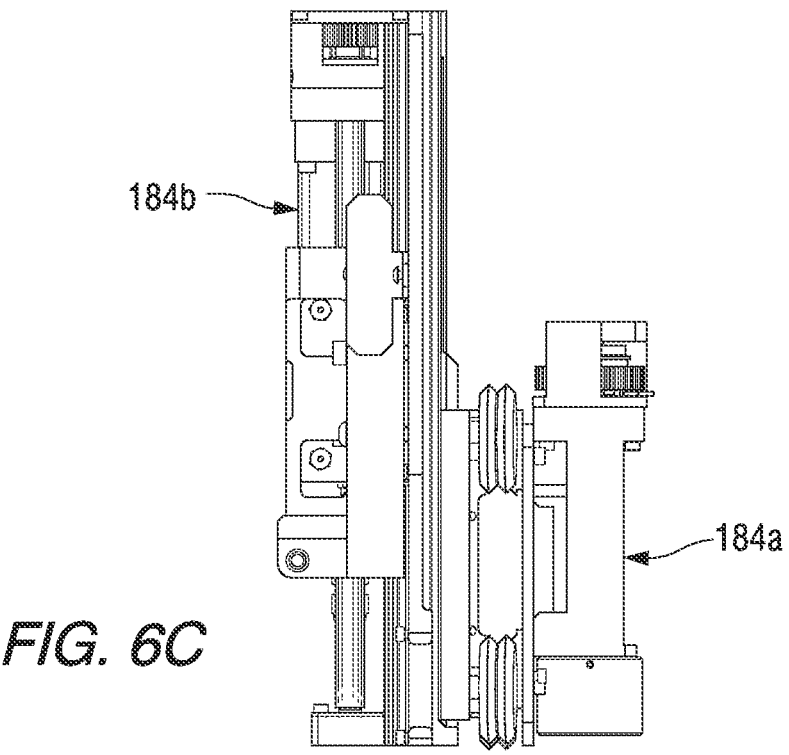
Figure 6D:
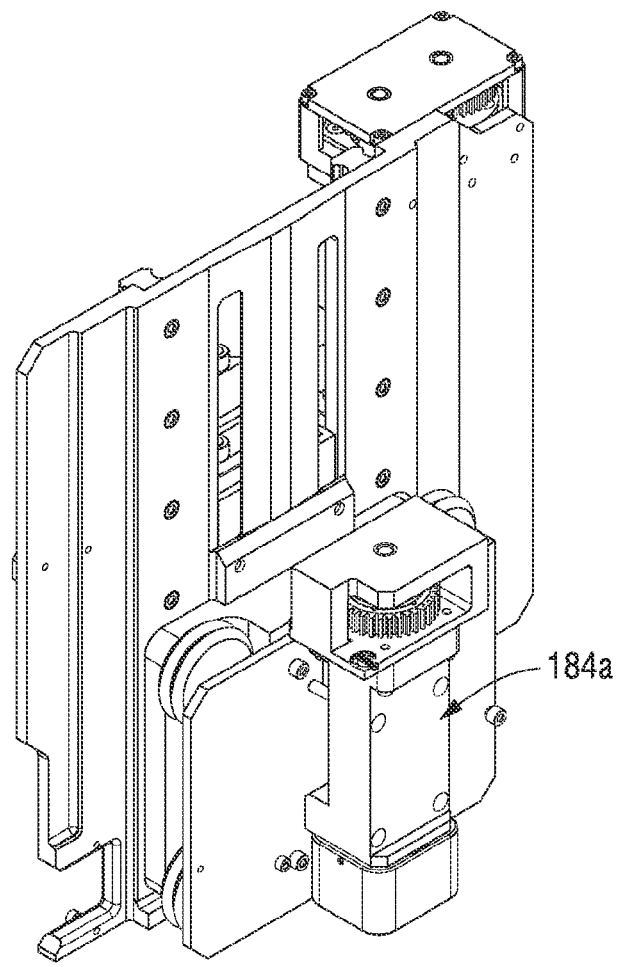

Referring to FIGS. 4 and 5, the frame 112 houses a fixed motor 175 and pinion gear 177 which can be driven and react against a rack gear 178 coupled to the lower track 120. Upon rotation of the frame motor 175, the lower track 120 moves relative to the frame 112.

As shown in FIG. 5 and FIGS. 6A-6D, the lower track 120 houses additional vertical and horizontal precision positioners 180 to provide precision position of tooling sensors or end effectors 182. The carriage system 122 on the lower track 120 houses two motor/gear combinations 184A,B and one pneumatic/hydraulic cylinder 185. One of the motor/gear combinations 184A interfaces with the rack gear 200 coupled to the lower track 120 which allows the carriage system 122 to move along the lower track 120. The other motor/gear combination 184B is coupled to a linear lead screw 190 which drives the pivoting cylinder 185 vertically in the general areas relative to the lower track 120. The pivoting cylinder 185 provides pivoting motion for the attached arm 134 and end effectors 182 for positioning the end effectors 182 away from reactor obstructions. Overall, the apparatus contains seventeen axes of motion to position sensor and end effectors 182 in an efficient method to minimize size, plant shutdown schedule impacts, and personnel radiological exposure, and to maximize end effector coverage on the reactor core shroud around obstructions.

Figure 7:
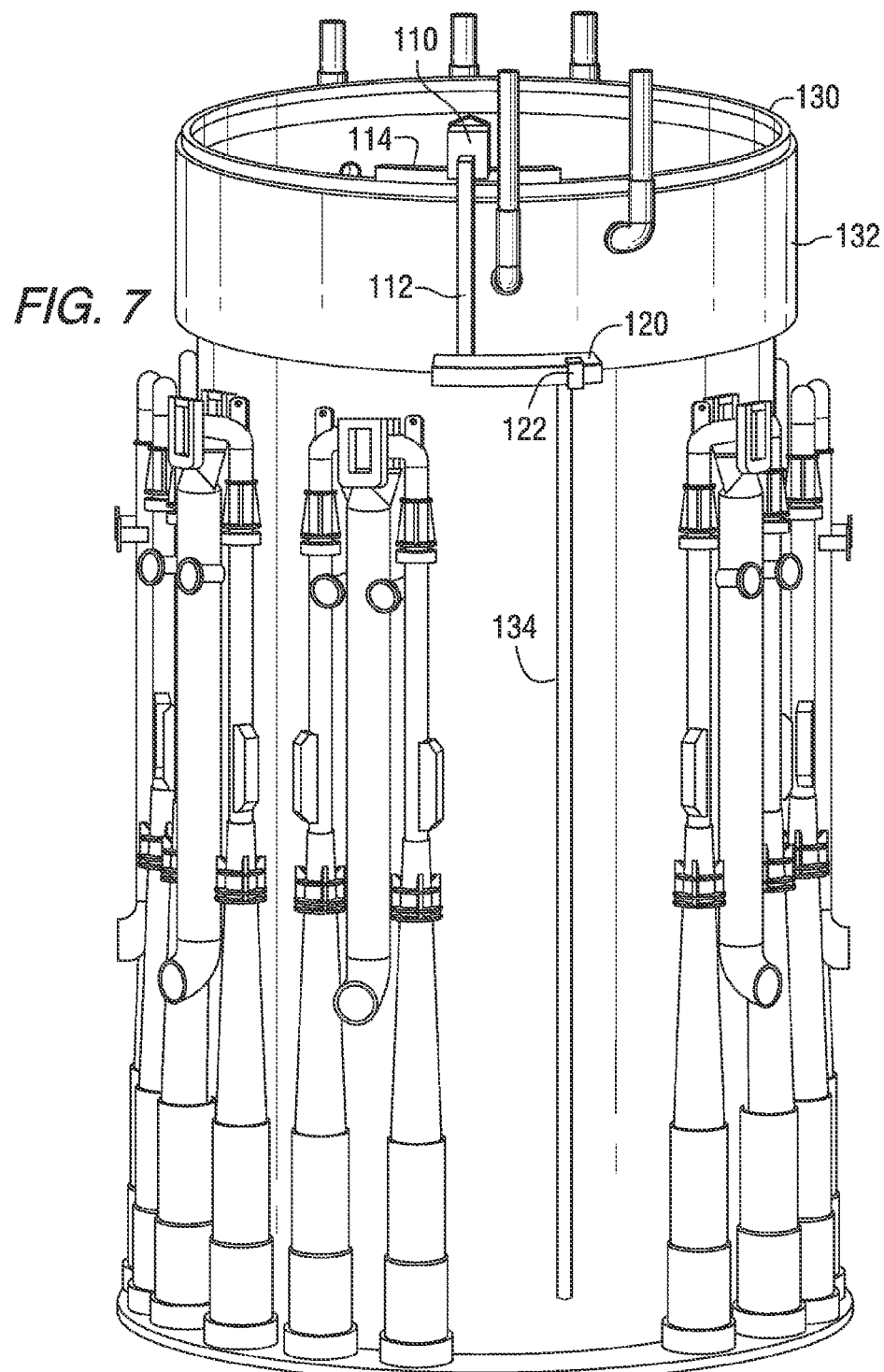
FIG. 7 is a front view of the core shroud inspecting apparatus of FIG. 2 installed on a core shroud of a nuclear reactor.

Referring to FIG. 7, there is illustrated the core shroud inspecting apparatus 100 (shown in FIG. 2) which is positioned on an annular rim 130 of a core shroud 132. The apparatus 100 extends vertically downward into an annulus space formed between the core shroud 132 and a reactor pressure vessel (not shown). FIG. 7 includes the head 110, frame 112, partial upper track 114, lower track 120, and the carriage 122 (as shown FIG. 2). Further, FIG. 7 includes an arm 134 connected to the carriage 122 and extending vertically downward therefrom along the core shroud 132. At least one sensor (not shown) is attached to the arm 134. The sensor is capable to detect and analyze the surface of the core shroud 132 including any welds contained therein. Suitable sensors for use in this invention can include those devices, such as but not limited to ultrasonic sensors, which are known in the art for inspections. In certain embodiments, multiple sensors can be positioned in a spaced apart relationship to each other along a vertical length of the arm 134. Placement, e.g., spacing, of the sensors can be determined by and correspond to specific areas of the core shroud 132 to be inspected, such as the middle and lower barrels (not shown). In FIG. 7, the lower track 120 is offset from the head 110 and the frame 112, and the carriage 122 with the arm 134 is offset from the lower track 120.

In certain embodiments, the apparatus and method of the invention does not include the partial upper track. In this embodiment, the head and frame assembly is positioned on the annular rim of the core shroud and the frame portion vertically extends into the annulus formed between the core shroud and the reactor pressure vessel. The lower track is movably connected to the frame portion to allow the lower track to travel horizontally relative to the frame portion. Further, the carriage and arm assembly is movably connected to the lower track to allow the carriage and arm to travel horizontally relative to the lower track. At least one sensor is connected to the arm for the purpose of performing a scan to inspect the core shroud.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

We claim:

1. An apparatus for remotely inspecting a core shroud of a nuclear reactor, comprising:
    a partial upper track positioned on an annular rim of the core shroud and horizontally movable along the rim;
    an assembly, comprising:
        a head movably connected to the partial upper track such that the head is horizontally movable along the partial upper track;
        a lower track;
        a frame having a first end and a second end, the first end being mounted to the head and the second end being connected to the lower track such that the lower track is horizontally movable along the core shroud;
        a carriage movably connected to the lower track;
        a scan arm connected to the carriage and extending vertically downward along the core shroud;
        at least one sensor connected to the scan arm for inspecting the core shroud;
        a first driving mechanism connected to the head and the partial upper track, and structured to drive the head along the partial upper track and to drive the partial upper track along the rim;
        a second driving mechanism connected to the frame and structured to drive the lower track along the core shroud; and
        a third driving mechanism connected to the carriage and structured to drive said carriage along the lower track; and
    a track brake system connected to the partial upper track, wherein, when the track brake system is activated, the partial upper track remains stationary and the head is movable along the partial upper track, and
    wherein, when the track brake system is deactivated, the partial upper track can be driven into a different position along the annular rim of the core shroud.

2. The apparatus of claim 1, wherein the partial upper track is positioned on a steam dam of the core shroud as a result of its center of gravity.

3. The apparatus of claim 1, wherein the head comprises a positioning pin which is vertically extendable.

4. The apparatus of claim 3, wherein when the positioning pin is extended and the track brake system is released, the head is stationary relative to the core shroud and the partial upper track is horizontally movable along the rim of the core shroud.

5. The apparatus of claim 1, wherein bearing wheels are attached to the frame such that the frame is horizontally movable along the lower track.

6. The apparatus of claim 1, wherein the carriage comprises cylinder selected from a pneumatic cylinder and a hydraulic cylinder structured such that the scan arm is pivotally movable relative to the carriage.

7. The apparatus of claim 1, wherein the sensor is an ultrasonic transducer.

\* \* \* \* \*